(12) United States Patent
Abraham et al.

(10) Patent No.: US 8,774,836 B2
(45) Date of Patent: Jul. 8, 2014

(54) METHOD AND SYSTEM FOR OPTIMIZED TRANSFER OF LOCATION DATABASE INFORMATION

(75) Inventors: Charles Abraham, Los Gatos, CA (US);
Mark Buer, Gilbert, AZ (US); David Garrett, Tustin, CA (US); Jeyhan Karaoguz, Irvine, CA (US); David Lundgren, Mill Valley, CA (US); David Murray, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 475 days.

(21) Appl. No.: 12/732,973

(22) Filed: Mar. 26, 2010

(65) Prior Publication Data

US 2011/0222471 A1    Sep. 15, 2011

Related U.S. Application Data

(60) Provisional application No. 61/312,970, filed on Mar. 11, 2010.

(51) Int. Cl.
*H04W 24/00* (2009.01)
*H04M 11/04* (2006.01)

(52) U.S. Cl.
USPC ............... 455/456.3; 455/456.5; 455/456.1; 455/404.2; 370/328

(58) Field of Classification Search
USPC .............. 455/456.5, 456.1, 404.2; 370/328
See application file for complete search history.

(56) References Cited

U.S. PATENT DOCUMENTS

| | | | |
|---|---|---|---|
| 2002/0077120 A1* | 6/2002 | Tijerino | 455/456 |
| 2003/0225893 A1 | 12/2003 | Roese et al. | |
| 2004/0203880 A1* | 10/2004 | Riley | 455/456.1 |
| 2006/0223549 A1* | 10/2006 | Chang | 455/456.2 |
| 2007/0054672 A1* | 3/2007 | Onishi et al. | 455/456.1 |
| 2007/0099634 A1* | 5/2007 | Chari et al. | 455/456.3 |
| 2008/0318596 A1* | 12/2008 | Tenny | 455/456.2 |

* cited by examiner

Primary Examiner — Ariel Balaoing
(74) *Attorney, Agent, or Firm* — Sterne, Kessler, Goldstein & Fox PLLC

(57) ABSTRACT

A servicing communication device may receive a subset of a location reference database that is maintained by a plurality of location servers, and may provide location related data to a mobile device that is communicatively coupled to the servicing communication device based on the received subset. The servicing communication device may determine capabilities and/or requirements of the mobile device, and may generate the location related data based on that determination. The servicing communication device may determine attributes and/or parameters that may affect determination of the subset of the location reference database. The subset of location reference database may be requested based on the determined attributes and/or parameters. The attributes and/or parameters may comprise a location of the servicing communication device. The servicing communication device may determine its location, directly based on GNSS transmissions and/or indirectly based on assisted GNSS (A-GNSS) data received from the plurality of location servers.

20 Claims, 5 Drawing Sheets

METHOD AND SYSTEM FOR OPTIMIZED TRANSFER OF LOCATION DATABASE INFORMATION

CROSS-REFERENCE TO RELATED APPLICATIONS/INCORPORATION BY REFERENCE

This patent application makes reference to, claims priority to and claims benefit from U.S. Provisional Application Ser. No. 61/312,970 filed on Mar. 11, 2010. This application makes reference to:
U.S Provisional Application Ser. No. 61/304,085 filed on Feb. 12, 2010;
U.S. application Ser. No. 12/748,270 filed on Mar. 26, 2010;
U.S Provisional Application Ser. No. 61/304,114 filed on Feb. 12, 2010;
U.S. application Ser. No. 12/729,184 filed on Mar. 22, 2010;
U.S. Provisional Application Ser. No. 61/304,128 filed on Feb. 12, 2010;
U.S. application Ser. No. 12/748,159 filed on Mar. 26, 2010;
U.S. Provisional Application Ser. No. 61/303,794 filed on Feb. 12, 2010;
U.S. application Ser. No. 12/748,197 filed on Mar. 26, 2010;
U.S. Provisional Application Ser. No. 61/306,387 filed on Feb. 19, 2010; and
U.S. application Ser. No. 12/748,212 filed on Mar. 26, 2010.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communication. More specifically, certain embodiments of the invention relate to a method and system for optimized transfer of location database information.

BACKGROUND OF THE INVENTION

Location based services (LBS) applications are emerging as a new type of value-added service provided by mobile communication network. LBS applications are mobile services in which the user location information is used to enable and/or support various applications and/or services such as, for example, enhanced 911 (E-911), location-based 411, location-based messaging and/or location-based friend finding services. A location of a communication device may be determined in different ways such as, for example, using network-based technology, using terminal-based technology, and/or hybrid technology, which may be a combination of the former technologies. Many positioning technologies such as, for example, Time of Arrival (TOA), Observed Time Difference of Arrival (OTDOA), Enhanced Observed Time Difference (E-OTD) as well as the Global navigation satellite-based systems (GNSS) such as Global Positioning System (GPS), Global Navigation Satellite System (GLONASS), Galileo, and/or Assisted-GNSS (A-GNSS), may be utilized to estimate the location (latitude and longitude) of the communication device and convert it into a meaningful X, Y coordinate for Location-Based Services provided via wireless communication systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for optimized transfer of location database information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for optimized transfer of location database information. In various embodiments of the invention, a servicing communication device, which may provide network access to mobile devices, may receive a subset of a location reference database, which may be maintained by a plurality of location servers. Exemplary servicing communication devices may comprise cellular base stations, WiMAX base stations, wireless local area network (WLAN) access points, femtocells, and/or personal communication devices. The servicing communication device may then provide location related data customized for a mobile device that is communicatively coupled to the servicing communication device based on the received subset of the location reference database. The servicing communication device may determine capabilities of and/or requirements for the mobile device, and may generate the customized location related data based on determined requirements and/or limitations.

The servicing communication device may determine attributes and/or parameters that may affect determination of the subset of the location reference database. The subset of the location reference database may be requested based on the determined attributes and/or parameters. The attributes and/or parameters may comprise a location of the servicing communication device, processing resources of the servicing communication device, storage resources of servicing communication device, load of the servicing communication device, and/or requirement and/or limitation of the serviced mobile devices. The servicing communication device may determine its location, directly based on GNSS transmissions and/or indirectly based on assisted GNSS (A-GNSS) data received from the plurality of location servers. The subset of the location reference database may be received from the location servers via one or more broadband connections between the servicing communication device and the plurality of location servers. The subset maintained by the servicing communication device may be updated and/or reloaded from the location servers. The updating and/or reloading of the subset of the location reference database may be performed periodically, based on scheduling data. The scheduling of subset reloads and/or updates, and/or data therefor, may be predetermined and/or preconfigured by the servicing communication device and/or the location servers. Updating and/or reloading of the subset of the location reference database may also be performed dynamically. In this regard, the updating and/or reloading may be performed dynamically based on the load of the location servers and/or based on a determination that material changes may have occurred which may affect previously loaded subsets.

Figure 1:
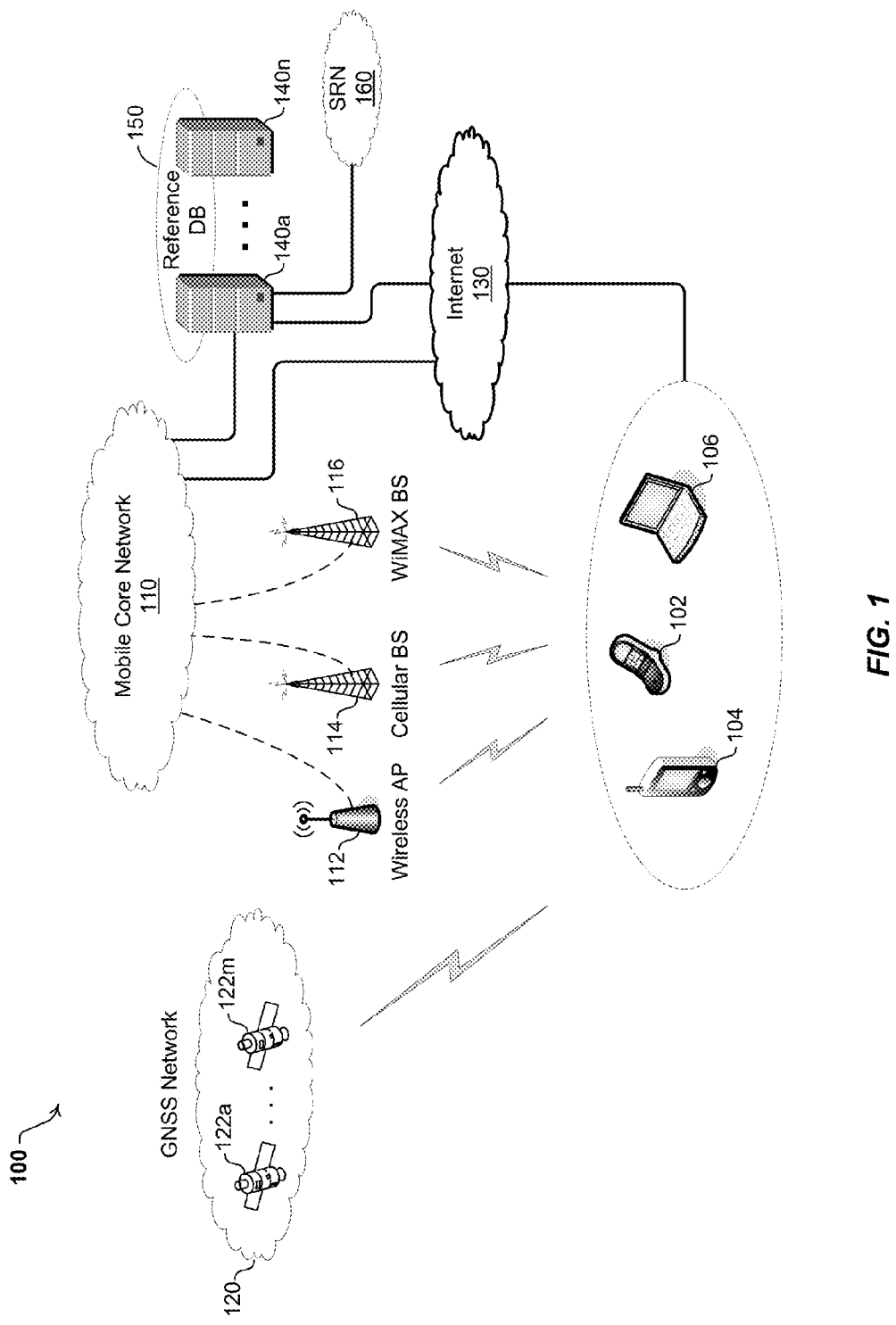
FIG. 1 is a block diagram illustrating an exemplary communication system that provides location based services to a plurality of communication devices, in accordance with an embodiment of the invention.

FIG. 1 is a block diagram illustrating an exemplary communication system that provides location based services to a plurality of communication devices, in accordance with an embodiment of the invention. Referring to FIG. 1, there is shown a communication system 100 comprising a plurality of communication devices, of which a wireless access point (AP) 112, a cellular base station (BS) 114, a Worldwide Interoperability for Microwave Access (WiMAX) BS 116, and mobile devices 102-106 are illustrated. Exemplary mobile devices may comprise cellular device 102, Smartphone 104, and/or laptop 106. Also shown in the communication system 100 is a mobile core network 110, a Global Navigation Satellite Systems (GNSS) network 120, a plurality of GNSS satellites 122a-122m, an Internet 130, a plurality of location servers 140a-140n, and a satellite reference network (SRN) 160.

The GNSS network 120 may comprise suitable logic, circuitry, interfaces, and/or code that may provide navigation information to land-based devices via satellite links. The GNSS network 120 may provide positioning information via downlink satellite links transmitted to land-based devices, such the wireless AP 112, the cellular BS 114, the WiMAX BS 116, and/or the mobile devices 102-106, to enable determining their locations. In this regard, the GNSS network 120 may comprise, for example, the GNSS satellites 122a-122m, each of which is operable to provide satellite transmissions based on a global navigation satellite system (GNSS). Exemplary GNSS systems may comprise, for example, the Global Positioning System (GPS), GLONASS and/or Galileo based satellite system. The plurality of GNSS satellites 122a-122m may directly provide positioning information and/or a land-based device may utilize satellite transmissions from different satellite to determine its location using, for example, triangulation based techniques.

The Internet 130 may comprise a system of interconnected networks and/or devices that enable exchange of information and/or data among a plurality of nodes, based on one or more networking standards, including, for example, Internet Protocols (IP). The Internet 130 may enable, for example, connectivity among a plurality of private and public, academic, business, and/or government nodes and/or networks, wherein the physical connectivity may be provided via the Public Switched Telephone Network (PSTN), utilizing copper wires, fiber-optic cables, wireless interfaces, and/or other standards-based interfaces.

The mobile core network 110 may comprise suitable logic, circuitry, interfaces, and/or code that are operable to provide interfacing and/or connectivity among one or more access networks, which may provide network accessibility to mobile devices. The mobile core network 100 may also provide interacting and/or connectivity with external data networks such as packet data networks (PDNs) and/or the Internet 130. The mobile devices 102-106 may access the mobile core network 110, for example, via the wireless AP 112, the cellular BS 114, and/or the WiMAX BS 116. The mobile core network 110 may be configured to communicate various data services, which are provided by external data networks, to associated users.

Each of wireless AP 112, the cellular BS 114, and the WiMAX BS 116 is operable to implement various aspects of the invention disclosed herein. In this regard, the wireless AP 112 may comprise suitable logic, circuitry, interfaces, and/or code that are operable to provide data services to communication devices, such as one or more of the mobile devices 102-106, in adherence with one or more wireless LAN (WLAN) standards, which may comprise, for example, IEEE 802.11, 802.11a, 802.11b, 802.11d, 802.11e, 802.11n, 802.11v, and/or 802.11u. The wireless AP 112 may communicate with the mobile core network 110 and/or the Internet 130, via one or more links and/or associated devices for example. In this manner, the wireless AP 112 may provide network access to the mobile devices 102-106.

The cellular BS 114 may comprise suitable logic, circuitry, interfaces, and/or code that are operable to provide voice and/or data services to communication devices, such as one or more of the mobile devices 102-106, in adherence with one or more cellular communication standards. Exemplary cellular communication standards may comprise Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). The cellular BS 114 may communicate with the mobile core network 110 and/or the Internet 130, via one or more backhaul links and/or associated devices for example. In this manner, the cellular BS 114 may provide network access to the mobile devices 102-106.

The WiMAX BS 116 may comprise suitable logic, circuitry, interfaces, and/or code that are operable to provide WiMAX based data services to communication devices, such as one or more of the mobile devices 102-106. The WiMAX BS 116 may communicate with the mobile core network 110 and/or the Internet 130, via one or more backhaul links and/or associated devices for example. In this manner, the WiMAX BS 116 may provide network access to the mobile devices 102-106.

Each of the mobile devices 102-106 may comprise suitable logic, circuitry, interfaces, and/or code for implementing various aspects of the invention disclosed herein. In this regard, each of the mobile devices 102-106 may be operable to communicate via a plurality of wired and/or wireless connections, based on wired and/or wireless protocols and/or standards. For example, each of the mobile devices 102-106 may be operable to transmit and/or receive signals to and/or from one or more of the wireless AP 112, the cellular BS 114, WiMAX BS 116, GNSS network 120, and/or the Internet 130. Also, each of the mobile devices 102-106 may be operable to communicate with, and/or receive services provided by the Internet 130 and/or the mobile core network 110. The mobile devices 102-106 may also be operable to utilize and/or support LBS applications.

Each of plurality of location servers 140a-140n may comprise suitable logic, circuitry, interfaces, and/or code that are operable to provide and/or support location based services (LBS). In this regard, the location servers 140a-140n may store and/or process location related data associated with communication devices in the system 100, for example, and may provide location related data when requested to do so. Each of the plurality of location servers 140a-140n may be operable to collect and/or retrieve location related data directly from the communication devices. The plurality of location servers 140a-140n may also be operable to collect and/or update location related data independently and/or autonomously, by accessing and/or communicating with the SRN 160, for example. The SRN 160 may comprise suitable logic, circuitry, interfaces, and/or code that are operable to collect, compile, and/or distribute data GNSS based data, on a continuous basis. The collected data may be utilized to provide location information to devices and/or entities in lieu of and/or in addition to location data that are collected by other means (e.g. directly based on GNSS reception). In this regard, the SRN 160 may comprise a plurality of GNSS reference tracking stations located around the world to provide Assisted-GNSS (A-GNSS) coverage all the time in both a home network and/or any visited network. The SRN 160 may utilize, for example, satellite signals received from various GNSS constellations, such as, for example, the plurality of GNSS satellites 122a-122m of the GNSS network 120.

In an exemplary aspect of the invention, the plurality of location servers 140a-140n may utilize a reference database 150 for maintaining profile elements comprising location related data corresponding to a plurality of communication devices. In this regard, each profile element in the reference database 150 may comprise information that associates location data, such as latitude and longitude (LAT/LON) and/or altitude for example, with unique identifying parameters corresponding to communication devices. At least some of the communication devices, whose location related data is stored in the reference database 150, may be servicing communication devices. In this regard, the servicing communication devices may provide network access services to one or more communicative devices, via wired and/or wireless connections. Exemplary servicing communication devices may comprise personal communication devices, wireless access points, WiMAX base stations, cellular base stations, and/or femtocells.

In various embodiments of the inventions, the location related data corresponding to servicing communication devices, which may be stored in the reference database 150, may comprise, location and/or identifying information, and operability related data, such as, for example, scrambling codes, frequencies and/or other broadcast attributes. Accordingly, a mobile device, such as the mobile device 104 for example, may be operable to approximate a position and/or a location of servicing communication devices based on, for example, the location related data of the servicing communication device. In this regard, the mobile device may obtain the location related data corresponding to the servicing communication devices from the reference database 150, which may be accessed and/or retrieved via the location servers 140a-140n. In an exemplary embodiment of the invention, the reference database 150 may comprise location related data for all servicing communication devices worldwide. In this regard, obtaining the entire reference database 150, as whole may provide a mobile device with location related data for all servicing communication devices and/or entities anywhere.

In operation, the system 100 may provide network access to communication devices, such as the mobile device 102-106, via a plurality of wireless and/or wired networks. In this regard, the mobile device 102-106 may obtain network access wirelessly via the wireless AP 112, the cellular BS 114, and/or the WiMAX BS 116; and/or using wired connections, such as Ethernet based connections, to the Internet 130. The system 100 may also enable obtaining network access in a communication device via other communication devices. For example, the Smartphone 104 may utilize a wireless personal area network (WPAN) link to communicate with the laptop 106, using the network accessibility available via the laptop 106. Exemplary WPAN protocol may comprise, for example, Bluetooth and/or ZigBee.

The system 100 may support location based services (LBS). In this regard, the plurality of location servers 140a-140m may provide location based services (LBS) in the system 100. The location server 140a may generate, store, and/or update, in the reference database 150 for example, profile elements corresponding to communication devices in the system 100, such one or more of the wireless AP 112, the cellular BS 114, the WiMAX BS 116, and/or the mobile devices 102-106, and/or users thereof, for example. The location server 140a may access the SRN 160 to collect GNSS satellite data, and may utilize the collected GNSS satellite data to generate GNSS assistance data (A-GNSS data) pertaining to, and/or associated with the communication devices supported in the system 100. The location server 140a may also collect and/or retrieve location related data directly from the mobile devices 102-106, and/or from other communication devices in the system 100, such as, for example, the wireless AP 112, the cellular BS 114, and/or the WiMAX 116. The location related data may be stored in the reference database 150. The location server 140a may communicate the stored location related data when requested to do so. In addition, the reference database 150 maintained and/or utilized by the location server 140a may be modified, refined, and/or updated. The adjustments may be performed, for example, based on location related data received from the SRN 160. Location related data received from the mobile devices 102-106 and/or other communication devices in the system 100, and/or based on uses of and/or actions performed in the communication devices. The location related data maintained by the location server 140a may be utilized to augment and/or substitute for location related data received and/or generated based on communication with the GNSS network 120, for example, when communication with the GNSS network 120 is disturbed.

The location based services (LBS) applications may be utilized in the system 100 for authentication purposes. In this regard, the location related data stored and/or maintained in the location server 140a may be utilized to authenticate one or more of the mobile devices 102-106, users thereof, and/or locations thereof during operations performed by the mobile devices 102-106. For example, service providers may communicate with the location server 140a to request or invoke performance of authentication procedures by the location server 140a, and/or to obtain information necessary for directly performing the authentication procedures. The service providers may comprise, for example, cellular, WiMAX, and/or WLAN services providers. The authentication procedures may be performed based on existing information in the reference database 150, and/or based on current location information, which may be obtained by, for example, communicating with the communication devices, to verify their current location and/or connectivity status (or parameters thereof), for example. Location related data and/or information may be communicated, for example, via the Internet 130, utilizing Broadband IP packets over wired based connections for example.

Furthermore, various security protocols and/or procedures may be used by and/or be implemented within the system 100 to ensure secure exchange of location related data among, for example, the location servers 140a-140n, serviced entities and/or devices which may need be authenticated, such as wireless AP 112, the cellular 114, the WiMAX AP 116, the mobile devices 102-106, (and/or users thereof); and/or other entities and/or devices that may seek and/or require authentication of serviced devices and/or may provide necessary information during any such operations, such as services providers.

In an exemplary aspect of the invention, mobile devices, such as one or more of the mobile devices 102-106, may determine and/or estimate position and/or location of available servicing communication devices, such as the wireless AP 112, the cellular 114, and/or the WiMAX AP 116 based on the location related data of the servicing communication device. In this regard, the mobile device 104, for example, may retrieve location related data corresponding to the servicing communication devices by accessing and/or retrieving the reference database 150, via the location server 140a for example. Obtaining the reference database 150 as a whole, however, may be undesirable, especially in instances where the size of the reference database 150 may be substantially large, such as when it is a global reference database for example. Large databases may require significant storage and/or processing resources, and/or downloading of such databases may consume substantial bandwidth, which may be especially undesirable when the data is transferred via wireless links. In many instances, mobile devices may only need a small portion of the reference database 150, because, for example, only a limited number of servicing communication devices may be effectively available for use by the mobile devices. This may be due to, for example, geographical limitations and/or unsuitability of the servicing communication devices (e.g. not supporting the same communication protocol). Furthermore, retrieving the reference database 150 directly by the mobile devices from the location server 140a-140n may also increase the load of the location server 140a-140n, because of the large number of accesses of the location server 140a-140n, and/or because of the corresponding necessary processing that may be required for these accesses.

Accordingly, in various embodiments of the invention, optimization techniques may be utilized to improve the efficiency of the distribution, dissemination and/or transfer of location related data available based on the reference database 150. For example, portions of the reference database 150, and/or some of the servicing operations otherwise performed by the location server 140a-140n, may be offloaded to intermediate devices and/or entities, such as, for example, servicing communication devices. In this regard, location related servicing may be improved by enabling servicing communication devices, such as the wireless AP 112, the cellular 114, and/or the WiMAX AP 116, to retrieve and/or locally maintain portions of the reference database 150. The mobile devices, such as the mobile device 104, may then obtain location related data from servicing communication devices to which they may be connectively coupled, without having to interact directly with the location servers 140a-140n. Distribution of information from the reference databases may also be enhanced by performing at least some of the interactions between the location servers and the servicing communication devices via wired based connections. This may be done using Broadband IP packets for example, which may be communicated between the wireless AP 112 and the location server 140a, for example, via the mobile core network 110 and/or the Internet 130.

The location servers, such as the location servers 140a-140n, and/or the servicing communication devices may collectively and/or separately determine the subsets of the reference databases, which may be loaded into the servicing communication devices. In this regard, various parameters and/or criteria may be utilized for making that determination. For example, the subsets of the reference databases may be determined based on the location of the servicing communication devices. In this regard, a servicing communication device, such as the wireless AP 112, may first determine its location. The location determination may be performed based on, for example, GNSS signals reception and/or processing by the wireless AP 112, and/or based on location related data and/or servicing initially provided by and/or retrieved from the location server 140a.

In addition to the location of the wireless AP 112, determining the subset of the reference database 150 that may be loaded into, and/or may be maintained by the wireless AP 112 may be based on additional factors, such as, for example, the processing and/or storage resources of the wireless AP 112. Configuration parameters, for the wireless AP 112 and/or the location servers 140a-140n, may also be utilized to determine and/or adjust the geographical limits defining the loaded subset. The loaded subset may be further refined, via the wireless AP 112 and/or the location servers 140a-140n, based on operational criteria. In this regard, the loaded subset may be defined and/or adjusted based on preconfigured and/or dynamically determined parameters defining, for example, a number of types of communication protocols supported by other servicing communication devices whose location related data may be included in the loaded subset.

The servicing communication devices may obtain subsets of reference databases initially, when they come online. For example, when the wireless AP 112 comes online and/or is activated, the wireless AP 112 may communicate with the location server 140a to obtain a portion of the reference database 150. The loaded portion may then be continually updated. Updating and/or reloading portions of the reference database 150 may be performed periodically, based on predetermined scheduling information for example, and/or it may be performed dynamically, based on determination that the reference database 150 may have been modified in a way that may affect the portion that was previously loaded into the wireless AP 112. In an exemplary embodiment of the invention, the initial loading of portions subsets of reference databases into the servicing communication devices, and/or any updates or reloads thereafter, may be performed under certain conditions. For example, initial loading of a portion of the reference database 150 into the wireless AP 112, and/or any reloads or updates thereafter, may only be performed at times of low traffic in the system 100 and/or low load in the wireless AP 112 and/or the location servers 140a-140n. Low traffic and/or low load may occur during off-peak hour, for example.

Figure 2:
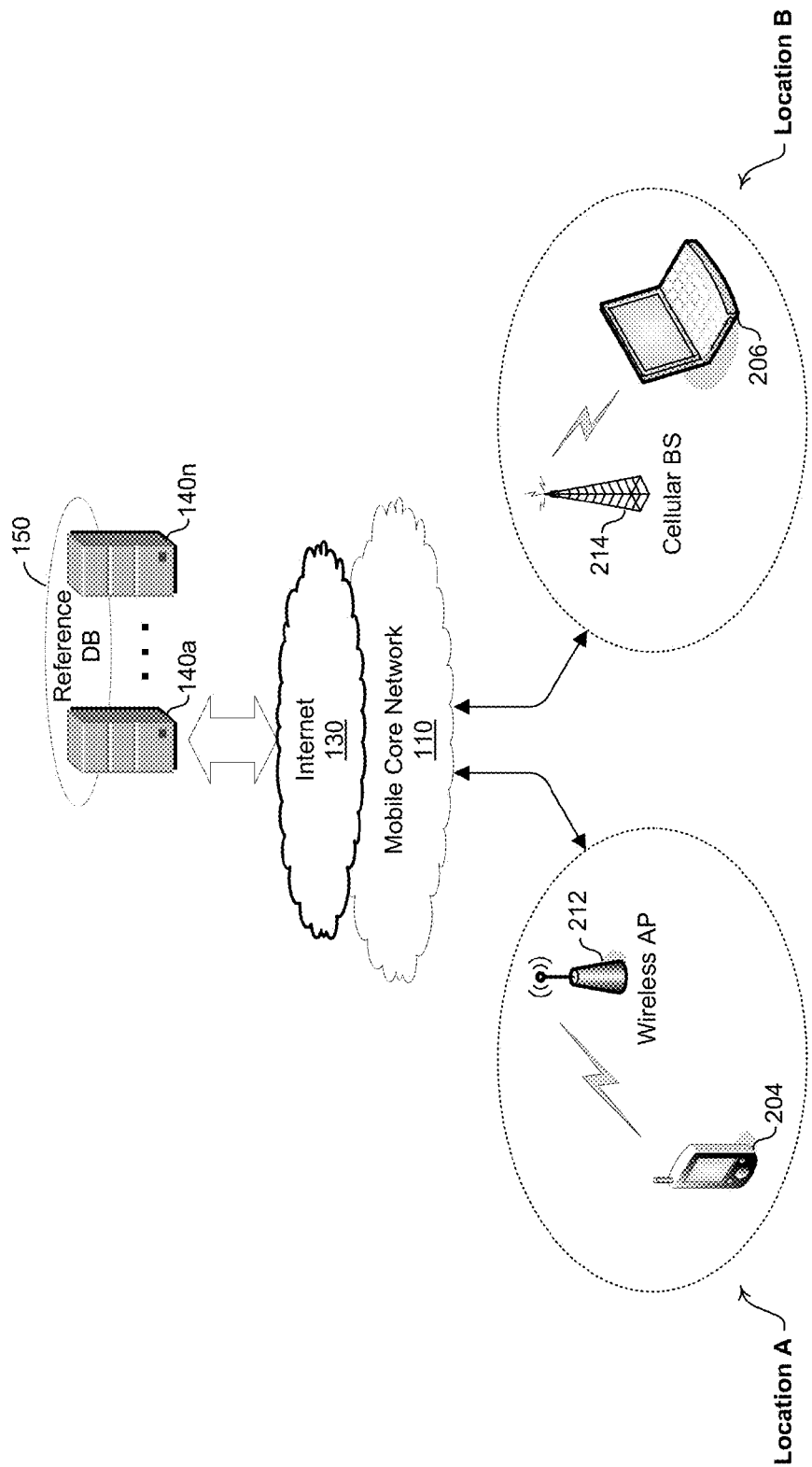
FIG. 2 is a block diagram illustrating an exemplary communication device that is operable to optimize transfer of location database information, in accordance with an embodiment of the invention.

FIG. 2 is a block diagram illustrating an exemplary communication device that is operable to optimize transfer of location database information, in accordance with an embodiment of the invention. Referring to FIG. 2, there is shown, mobile devices 204 and 206, a wireless access point (AP) 212, and a cellular base station (BS) 214.

The mobile device 204 and 206 may be similar to the mobile devices 104 and 106, respectively, substantially as described with regard to, for example, FIG. 1. The mobile device 204 may comprise a Smartphone, and/or the mobile device 206 may comprise a laptop, for example. The wireless AP 212 and the cellular BS 214 may be similar to the wireless AP 112 and the cellular BS 114, respectively, substantially as described with regard to, for example, FIG. 1.

In operation, the wireless AP 212 and cellular BS 214 may each receive a different subset of the reference database 150, corresponding to each of location A and location B, respectively, substantially as described with regard to, for example, FIG. 1. In this regard, the wireless AP 212 may initially determine its position, which may be determined based on, for example, GNSS signals reception and/or processing by the wireless AP 212, and/or based on location related data and/or servicing provided by and/or retrieved from the location servers 140a-140n. The wireless AP 212 may interact with the location servers 140a-140n via the mobile core network 110 and/or the Internet 130. Accordingly, once the position of the wireless AP 212 is determined to correspond to location A, a subset of the reference database 150 corresponding to location A may be loaded from the location servers 140a-140n. Determining the subset of reference database 150 corresponding to location A, which is loaded into to wireless AP 212, may be based on a plurality of parameters, including, for example, geographical limitations (e.g. a circle with 10 km radius), number and/or type of servicing communication devices available nearby, estimated number of mobile devices that may be serviced, and/or processing or storage resources of the wireless AP 212.

Similarly, the cellular BS 214 may receive a subset of the reference database 150 corresponding to location B.

In an exemplary aspect on the invention, the wireless AP 212 and/or the cellular BS 214 may generate and/or provide customized location related data to mobile devices that may be serviced and/or may become communicatively coupled to the wireless AP 212 and/or the cellular BS 214. In this regard, the customized location related data may be generated and/or derived from subsets of the reference database 150, which may be received and/or maintained by the wireless AP 212 and/or the cellular BS 214. For example, when the mobile device 104 becomes communicatively coupled to the wireless AP 212, the wireless AP 212 may generate location related data which may be customized for the mobile device 204, and which may be generated from the location A based subset of the reference database 150 received from the location servers 140a-140n. In this regard, the wireless AP 212 may initially determine, based on communication with the mobile device 204 for example, capabilities of and/or requirements for the mobile device 204 which may affect location related servicing and/or applications. The requirements and/or limitations may be based on, and/or be derived from user input in, configuration data for, and/or based on communication, processing, and/or storage resources of the mobile device 204. The customized location related data may then be generated based on the determined requirements and/or limitations. For example, information corresponding to WiMAX base stations in location A may be excluded from the customized location related data generated for mobile device 204 based on user input and/or due to lack of support of WiMAX communication in the mobile device 204. Also, information corresponding to WiFi access points may be omitted if the processing and/or storage resources of the mobile 204 are deemed to be insufficient to support multimedia broadcasts over wireless links. The cellular BS 214 may similarly generate location related data that are customized for the mobile device 206 corresponding to location B based on a subset of the reference database 150 received from the location servers 140a-140n.

In an exemplary embodiment of the invention, portions of the reference database 150, or updates thereto, which may be used by the wireless AP 212 and/or the cellular BS 214 for generating customized location related data for the mobile devices 204 and 206, respectively, may be requested and/or received after the mobile devices 204 and/or 206 is communicatively coupled to the wireless AP 212 and/or the cellular BS 214, and/or after determining the location related servicing requirements and/or limitations of the mobile devices 204 and/or 206. Alternatively, the wireless AP 212 and/or the cellular BS 214 may use preexisting loaded subsets of the reference database 150.

Figure 3:
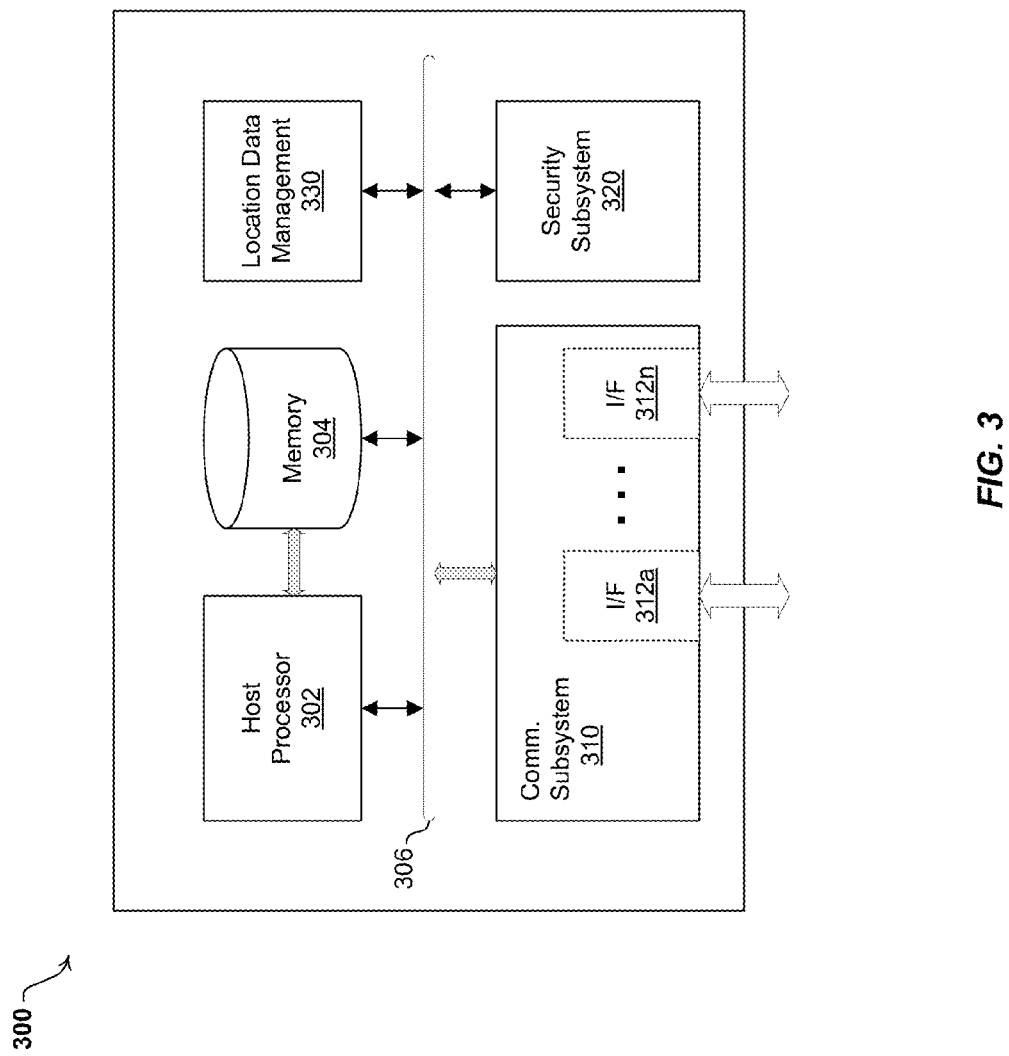
FIG. 3 is a block diagram illustrating an exemplary processing system that is operable to support optimized transfer of location database information in a communication device, in accordance with an embodiment of the invention.

FIG. 3 is a block diagram illustrating an exemplary processing system that is operable to support optimized transfer of location database information in a communication device, in accordance with an embodiment of the invention. Referring to FIG. 3 there is shown a system 300, a host processor 302, a system memory 304, a system bus 306, a communication subsystem 310, a security subsystem 320, and a location data management processor 330.

The system 300 may comprise the host processer 302, the system memory 304, the system bus 306, the communication subsystem 310, the security subsystem 320, and the location data management processor 330. The system 300 may be integrated into a servicing communication device, such as the wireless AP 112 and/or the wireless AP 212, to support and/or implement various aspects of the invention disclosed herein, substantially as described with regard to, for example, FIGS. 1 and 2.

The host processor 302 may comprise suitable logic, circuitry, interfaces, and/or code that may be operable to process data and/or control operations of the system 300. In this regard, the host processor 302 may configure and/or control operations of various components and/or systems of the system 300, by providing, for example, control signals. The host processor 302 may also control data transfers within the system 300. The host processor 302 may enable execution of applications, programs and/or code, which may be stored in the system memory 304 for example, to enable performing various web browsing support operations. The system memory 304 may comprise suitable logic, circuitry, interfaces, and/or code that enable permanent and/or non-permanent storage and/or fetching of data, code and/or other information used in the system 300. In this regard, the system memory 304 may comprise different memory technologies, including, for example, read-only memory (ROM), random access memory (RAM), and/or Flash memory. The system memory 304 may store, for example, information comprising configuration data. The configuration data may comprise parameters and/or code, which may comprise software and/or firmware, but the configuration data need not be limited in this regard.

The system bus 306 may comprise suitable logic, circuitry, interfaces, and/or code that may enable exchange of data and/or information between various components and/or systems in the system 300. In this regard, the system bus may comprise parallel or serial, and/or internal or external based bus technologies, and/or any combinations thereof. Exemplary system bus interfaces may comprise Inter-Integrated Circuit (I²C), Universal Serial Bus (USB), Advanced Technology Attachment (ATA), Small Computer System Interface (SCSI), Peripheral Component Interconnect (PCI), and/or Peripheral Component Interconnect Express (PCI-e) based interfaces.

The communication subsystem 310 may comprise suitable logic, circuitry, code, and/or interfaces that may enable communication of data, content, and/or messaging from and/or to the system 300, based on one or more wired and/or wireless protocols. The communication subsystem 310 may comprise, for example, a plurality of I/F processing blocks 312a-312n that may be operable to perform communication based on wired or wireless standards supported in the system 300. In this regard, each of the plurality of I/F processing blocks 312a-312n may comprise suitable logic, circuitry, interfaces, and/or code that are operable to detect, receive, and/or transmit signals based on specific frequency bands and/or modulation schemes. The I/F processing blocks 312a-312n may also be operable to perform necessary processing operations, which may comprise, for example, buffering, filtering, modulation/demodulation, up-conversion/down-conversion, and/ or digital-to-analog/analog-to-digital conversion. The plurality of the IF processing blocks 312a-312n may be configured to support, for example, transmission and/or reception of RF signals during communication based on Ethernet, Bluetooth, WLAN, cellular, WiMAX, GNSS, FM interfaces and/or protocols.

The security subsystem 320 may comprise suitable logic, circuitry, interfaces, and/or code that may operable to perform security related operations in the system 300. In this regard, the security subsystem 320 may perform device and/or user authentication, certificate usage, and/or cryptographic operations in the system 300.

The location data management processor 330 may comprise suitable logic, circuitry, interfaces, and/or code that may operable to manage and/or control location related servicing in the system 300, in accordance with various aspects of the invention disclosed herein, substantially as described with regard to, for example, FIGS. 1 and 2. While the location data management processor 330 is shown as a separate component within the system 300, the invention need not be so limited. For example, the functionality and/or operations described herein with regard to the location data management processor 330 may be performed by other components of the system 300, such as the host processor 302 for example.

In operation, the system 300 may be operable to support communication and/or provide network access based on one or more wired or wireless interfaces. In this regard, the system 300 may provide network accessibility and/or communication, via the communication subsystem 310, over wired-based Ethernet, WPAN, WLAN, cellular, WiMAX, femtocell, GNSS, FM based connections. During operations in the system 300, the host processor 302 may manage and/or control operations of, for example, communication subsystem 310 and/or security subsystem 320. In an exemplary aspect of the invention, the system 300 may be operable to support LBS applications and/or services. In this regard, the system 300 may communication with, using the communication subsystem 310 for example, a location server, such as the location server 140a of FIG. 1. For example, the system 300 may interact with the location server 140a, via the internet 130 for example, using the I/F processing block 312a, which may be configurable for wired, Ethernet based communications. During LBS related operations in the system 300, the security subsystem 320 may support various authentication and/or confidentiality related operations performed via the system 300. In this regard, the security subsystem 320 may assist and/or interact with the location server 140, for example, to enable performing communication device and/or user authentication procedures.

In an exemplary aspect of the invention, the system 300 may be operable to receive and/or maintain a portion of reference database, such the reference database 150. In this regard, the location data management processor 330 may manage and/or control reception and/or maintenance of a portion of the reference database 150. The system 300 may request a subset of the reference database 150, and/or may receive that subset of the reference database 150 from the location server 140a, via Broadband IP packets, communicated via its configured Ethernet connectivity. The received subset of the reference database 150 may be processed by the location data management processor 330 and/or the host processor 302, and/or may be stored in and retrieved from the system memory 304, for example, for subsequent location related servicing by the system.

The system 300 may then utilize the received and/or maintained portion of the reference database 150 to generate customized location related data for mobile devices serviced by the system 300. In this regard, mobile devices may initially establish connections to the system 300, over interfaces supported by the communication subsystem 310, for example. The location data management processor 330 may manage and/or control generation of customized location related data for mobile devices serviced by the system 300. For example, the location data management processor 330 may interact with serviced mobile devices, using the communication subsystem 310 for example, to obtain location related servicing requirements and/or limitations for each of the serviced mobile devices, substantially as described with regard to, for example, FIG. 2. The location data management processor 330 may then, directly or via the host processor 302, retrieve necessary location information from the locally maintained subset of the reference database 150. The retrieved information may be utilized to generate customized location related data for each serviced mobile device based on, for example, configuration parameters and/or obtained requirements and/ or limitations of the serviced mobile device.

Figure 4:
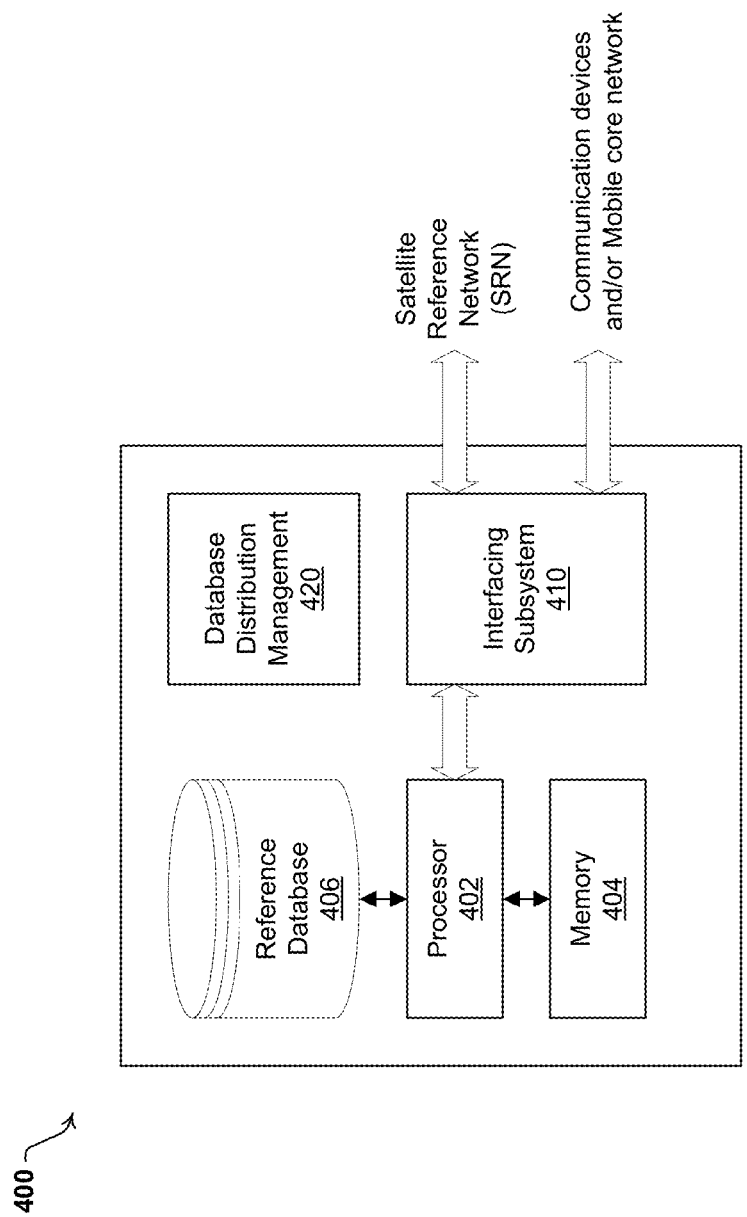
FIG. 4 is a block diagram illustrating an exemplary location server, in accordance with an embodiment of the invention.

FIG. 4 is a block diagram illustrating an exemplary location server, in accordance with an embodiment of the invention. Referring to FIG. 4 there is shown a server 400, a host processor 402, a system memory 404, a reference database 406, an interfacing subsystem 410, and database distribution management processor 420.

The server 400 may comprise the host processor 402, the system memory 404, the reference database 406, the interfacing subsystem 410, and the database distribution management processor 420. The server 400 may correspond to, for example, one or more of the location servers 140a-140n of FIG. 1. In this regard, the server 400 may be operable to provide and/or support location based services (LBS). The server 400 may maintain, via the reference database 406 for example, data that may be used via mobile devices to identify and/or locate servicing communication devices at a certain location.

The host processor 402 may comprise suitable logic, circuitry, interfaces, and/or code that may be operable to manage and/or control operations of the server 400. In this regard, the host processor 402 may be operable to configure and/or control operations of various components and/or systems of the server 400, by providing, for example, control signals. The host processor 402 may also control data transfers within the system 400, including data storage and/or retrieval from system memory 404 and/or generating, storing, and/or updating elements in the reference database 406. The host processor 402 may enable execution of applications, programs and/or code, which may be stored in the system memory 404 for example, to enable performing various services and/or application requested from the server 400, including location based services (LBS) applications for example. The system memory 404 may comprise suitable logic, circuitry, interfaces, and/or code that enable permanent and/or non-permanent storage and/or fetch of data, code and/or other information used in the server 400. In this regard, the system memory 404 may comprise different memory technologies, including, for example, read-only memory (ROM), random access memory (RAM), and/or Flash memory. The system memory 404 may be operable to store, for example, data and/or code used during LBS operations in the server 400. The data and/or code may comprise configuration data or parameters, and the code may comprise operational code such as software and/or firmware, but the information need not be limited in this regard.

The reference database 406 may comprise suitable logic, circuitry, interfaces, and/or code that may be operable to store location related data of associated communication devices such as, for example, the mobile devices 102-106, and/or one or more servicing communication devices, such as the wireless AP 212 and/or the cellular BS 214. The reference database 406 may be internally or externally coupled to the server 400. The stored location related data may be provided to associated devices and/or users to support LBS applications. The reference database 406 may be operable to manage and update the stored location related data when requested, dynamically whenever any change is detected, and/or periodically. Furthermore, the reference database 406 may be updated and/or modified based on data communicated to the server 400 by, for example, the serviced mobile devices. In this regard, the reference database 406 may comprise data corresponding to at least some of the profile elements of the reference database 150, substantially as described with regard to FIG. 1.

The interfacing subsystem 410 may comprise suitable logic, circuitry, interfaces, and/or code that may enable communication of data, content, and/or messaging from and/or to the server 400. The interfacing system 410 may support, for example, a plurality of physical and/or logical connections, based on one or more wired and/or wireless interfaces in the server 400. In this regard, the interfacing system 340 may comprise, for example, one or more network interface cards (NIC) and/or wireless network interface cards (WNIC).

The database distribution management processor 420 may comprise suitable logic, circuitry, interfaces, and/or code that may operable to support optimization of distribution of information stored in the reference database 406. In this regard, the database distribution management processor 420 may manage and/or control distribution of subsets of the reference database 406 to intermediate devices, such as servicing communication devices, which may provide localized location related servicing to mobile devices. While the database distribution management processor 420 is shown as a separate component within the server 400, the invention need not be so limited. For example, the functionality and/or operations described herein with regard to the database distribution management processor 420 may be performed by other components of the server 400, such as the host processor 302 for example.

In operation, the server 400 may be utilized to provide location based services (LBS). To facilitate LBS operations and/or servicing via the server 400, the host processor 402 may be operable to communicate, via the interfacing subsystem 410, with a satellite reference network (SRN), such as the SRN 160, to collect, for example, GNSS satellite data by tracking GNSS constellations. The host processor 402 may utilize the collected GNSS satellite data to build and/or update the reference database 406, which may be coupled internally or externally to the server 400. The host processor 402 may retrieve or collect location related data from associated users, such as the device 200. The server 400 may provide location related data by retrieving it from the reference database 406. In this regard, the server 400 may store the location related data in the reference database 406 as profile elements that may be indexed using identifiers that are specific to supported devices and/or users thereof.

In an exemplary aspect of the invention, the server 400 may support and/or implement various optimization techniques, which may be utilized to improve the efficiency of the distribution, dissemination and/or transfer of location related data available based on the reference database 406. In this regard, the database distribution management processor 420 may interact, via the interfacing subsystem 410, with one or more servicing communication devices, to enable communication of portions of the reference database 406 to the servicing communication devices. Consequently, at least some of the servicing operations which may otherwise be performed by the server 400 may be performed directly by the servicing communication devices.

The database distribution management processor 420 may also manage and/or control continued updating of subsets of the reference database 406 previously loaded to servicing communication devices. In this regard, the database distribution management processor 420 may initiate and/or support updating and/or reloading procedures periodically, based on preconfigured scheduling data for example. Alternatively, the database distribution management processor 420 may initiate and/or support updating and/or reloading procedures dynamically, based on determination that the reference database 406 may have been modified in a manner that may affect a portion that was previously loaded into a particular servicing communication device. In an exemplary embodiment of the invention, the initial loading of subsets of reference database 406 into the servicing communication devices, and/or any updates or reloads thereafter, may be performed under certain conditions. For example, the database distribution management processor 420 may initiate and/or support loading, updating, and/or reloading procedures at times of low traffic in the server 400.

Figures 5A, 5B:
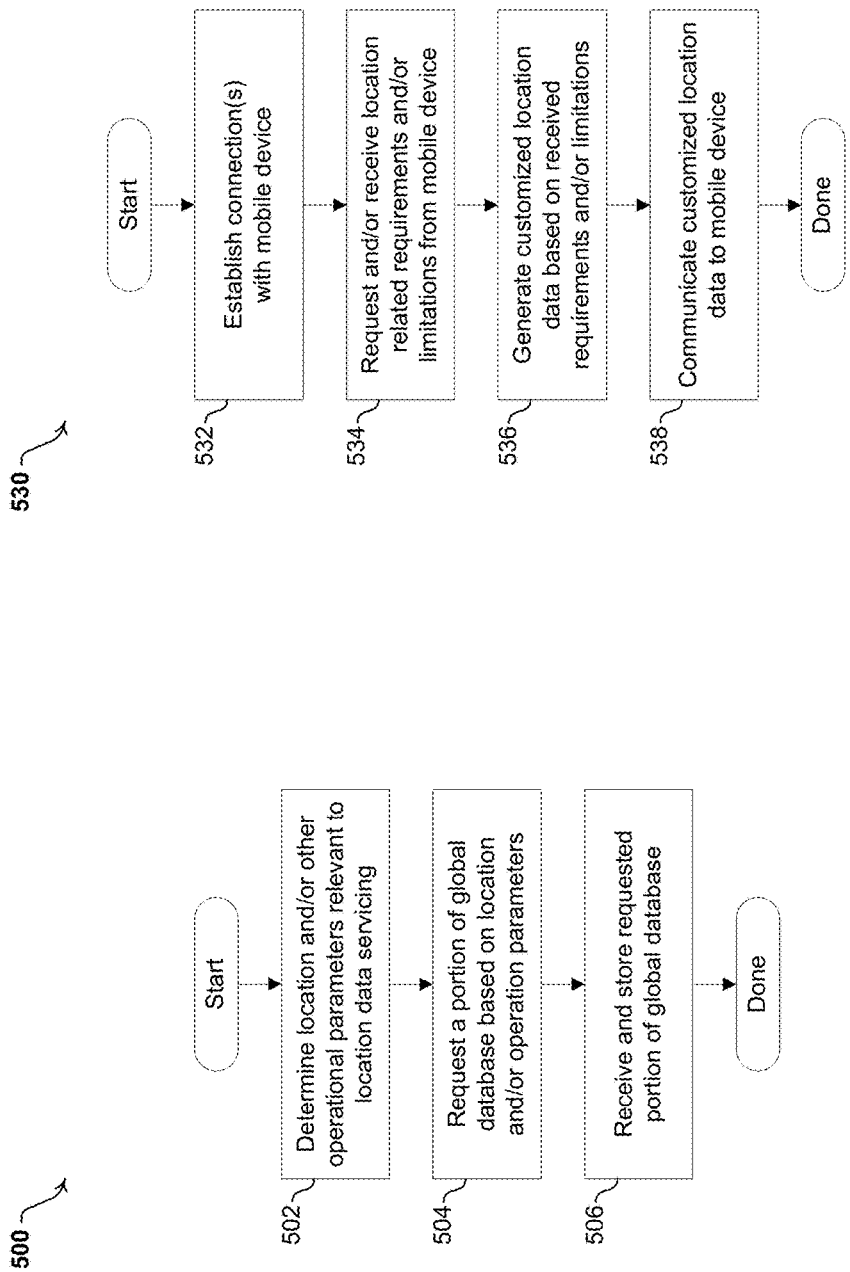
FIG. 5A is a flow chart that illustrates exemplary steps for obtaining a portion of global reference database by a servicing communication device, in accordance with an embodiment of the invention.
FIG. 5B is a flow chart that illustrates exemplary steps for providing location data by a servicing communication device to mobile devices, in accordance with an embodiment of the invention.

FIG. 5A is a flow chart that illustrates exemplary steps for obtaining a portion of global reference database by a servicing communication device, in accordance with an embodiment of the invention. Referring to FIG. 5A, there is shown a flow chart 500 comprising a plurality of exemplary steps that may be performed to obtain a customized portion of a global location reference database by a servicing communication device.

In step 502, a servicing communication device may determine its location and/or other operational parameters relevant to location data services provided by the servicing communication device to, for example, mobile devices. For example, the wireless AP 212 may determine its location and/or any additional operational parameters that may be relevant to location servicing operations in the location A, substantially as described with regard to, for example, FIG. 2. In step 504, the servicing communication device may request a portion of global reference database based on its determined location and/or operation parameters. For example, the wireless AP 212 may request, based on its location and/or any additional parameters, requirements, and/or limitations, a portion of the reference database 150, which may be maintained by the location servers 140a-140n. The requested portion of the reference database 150 may comprise location related data corresponding to other servicing devices that may be located within the location A, and/or within any additional distance therefrom. In step 506, the servicing device may receive and/or store the requested portion of global reference database.

FIG. 5B is a flow chart that illustrates exemplary steps for providing location data by a servicing communication device to mobile devices, in accordance with an embodiment of the invention. Referring to FIG. 5B, there is shown a flow chart 530 comprising a plurality of exemplary steps that may be performed to provide customized location reference data by a servicing communication device to servicing mobile devices.

In step 532, one or more connections may be established between a mobile device and a servicing communication device which may provide network access servicing, for example, to mobile devices. For example, connectivity may be established between the mobile device 204 and the wireless AP 212 in the location A, substantially as described with regard to, for example, FIG. 2. In step 534, the servicing communication device may request and/or receive location related requirements and/or limitations from the mobile device. For example, the wireless AP 212 may request and/or receive, from the mobile device 204, location servicing requirements and/or limitations of the mobile device 204. In this regard, the location servicing requirements and/or limitations may be based on and/or be comprised of, for example, user input, communication resources, processing resources, and/or storage resources in the mobile device 204.

In step 536, the servicing communication device may generate customized location data based on the received requirements and/or limitations. For example, the wireless AP 212 may generate customized location related data for the mobile device 204 based on the location servicing requirements and/or limitations received from the mobile device 204. In this regard, the generated customized location related data may be based on and/or be derived from a portion of the reference database 150, which may be obtained by the wireless AP 212 substantially as described with regard to FIG. 5A. The portion of the reference database 150 may be retrieved, and/or may be cached in and maintained by the wireless AP 212 prior to establishment of connectivity with the mobile device 204. Alternatively, the wireless AP 212 may dynamically obtain the required portion of the reference database 150 after connectivity with wireless AP 212 is established. Furthermore, in instances where the requirements of mobile device 204 may exceed currently cached location data in the wireless AP 212, the wireless AP 212 may obtain additional location related data from the location servers 140a-140n. In step 538, the servicing communication device may communicate customized location data to the mobile device. In this regard, once generated, the customized location related data may be forwarded from the wireless AP 212 to the mobile device 204.

Various embodiments of the invention may comprise a method and system for optimized transfer of location database information. The system 300, which may communicate with and/or provide network access to a plurality of mobile devices via the communication subsystem 310 for example, may receive a subset of the reference database 406, which may be maintained in the server 400. The system 300 may then generate and/or provide, by the location data management processor 330, location related data customized for a mobile device which may be communicatively coupled to the system 300. The customized location related data may be generated based on the received subset of the reference database 406. The system 300 may determine, via the location data management processor 330, capabilities of and/or requirements for serviced mobile device, and may generate the customized location related data based on determined requirements and/or limitations.

The system 300 may determine, by the location data management processor 330, attributes and/or parameters that may affect determination of the subset of the reference database 406. The subset of reference database 406 may be requested based on the determined attributes and/or parameters. The attributes and/or parameters may comprise a location of the system 300, processing resources of the system 300, storage resources of system 300, load of the system 300, and/or requirement and/or limitation of the serviced mobile devices. The system 300 may determine its location, directly based on received GNSS signals, via the communication subsystem 310 for example, and/or processing thereof. The system 300 may also determine its location based on, for example, assisted GNSS (A-GNSS) data received from the server 400. The subset of the reference database 406 may be received from the server 400 via one or more broadband connections between the system 300 and the server 400, over the Internet 130 for example, which may be supported via the communication subsystem 310 and/or the interfacing subsystem 410. The subset maintained by the system 300 may be updated and/or reloaded from the server 400. The updating and/or reloading of the subset of the reference database 406 may be performed periodically, based on determined or predetermined scheduling and/or data therefor, for example, and/or dynamically, based on a plurality of parameters and/or conditions. In this regard, the updating and/or reloading may be performed dynamically based on the load of the server 400 and/or based on determination that material changes may have occurred which may affect previously loaded subsets.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for optimized transfer of location database information.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
receiving, by a servicing communication device that provides network access to a plurality of mobile devices, a subset of information stored in a location reference database, wherein said location reference database is maintained by a plurality of location servers;
determining, after receiving the subset of information, parameters associated with a mobile device serviced by the servicing communication device;
generating location related data, customized with respect to the mobile device, based on the received subset of information and the determined parameters associated with the mobile device; and
communicating the generated location related data to the mobile device.

2. The method according to claim 1, wherein said servicing communication device further comprises a cellular base station, a WiMAX base station, a wireless local area network (WLAN) access point, a femtocell, or a personal communication device.

3. The method according to claim 1, comprising:
determining a plurality of attributes and/or parameters that determine said subset of information.

4. The method according to claim 3, further comprising:
requesting said subset of information from said plurality of location servers based on said determination of said plurality of attributes and/or parameters.

5. The method according to claim 3, wherein said plurality of attributes and/or parameters comprise a location of said servicing communication device, processing resources of said servicing communication device, storage resources of said servicing communication device, and/or load of said servicing communication device.

6. The method according to claim 1, further comprising determining a location of said servicing communication device.

7. The method according to claim 6, comprising determining said location of said servicing communication device directly based on GNSS transmissions and/or indirectly based on assisted GNSS (A-GNSS) data received from said plurality of location servers.

8. The method according to claim 1, wherein the determining comprises determining capabilities and/or requirements for said mobile device.

9. The method according to claim 1, comprising:
receiving said subset of information via one or more broadband connections between said servicing communication device and said plurality of location servers.

10. A system for communication, the system comprising:
one or more processors and/or circuits for use in a servicing communication device that provides network access to a plurality of mobile devices, said one or more processors and/or circuits being configured to:
receive a subset of information stored in a location reference database, wherein said location reference database is maintained by a plurality of location servers;
determine, after receiving the subset of information, parameters associated with a mobile device serviced by the servicing communication device;
generating location related data, customized with respect to the mobile device, based on the received subset of information and the determined parameters associated with the mobile device; and
communicate the generated location related data to the mobile device.

11. The system according to claim 10, wherein said servicing communication device comprises a cellular base station, a WiMAX base station, a wireless local area network (WLAN) access point, a femtocell, or a personal communication device.

12. The system according to claim 10, wherein said one or more processors and/or circuits are further configured to determine a plurality of attributes and/or parameters that determine said subset of information.

13. The system according to claim 12, wherein said one or more processors and/or circuits are further configured to request said subset of information from said plurality of location servers based on said determination of said plurality of attributes and/or parameters.

14. The system according to claim 12, wherein said plurality of attributes and/or parameters comprise a location of said servicing communication device, processing resources of said servicing communication device, storage resources of said servicing communication device, and/or load of said servicing communication device.

15. The system according to claim 10, wherein said one or more processors and/or circuits are further configured to determine a location of said servicing communication device.

16. The system according to claim 15, wherein said one or more processors and/or circuits are configured to determine said location of said servicing communication device directly based on GNSS transmissions and/or indirectly based on assisted GNSS (A-GNSS) data received from said plurality of location servers.

17. The system according to claim 10, wherein said one or more processors and/or circuits are further configured to determine capabilities and/or requirements for said mobile device.

18. The system according to claim 10, wherein said one or more processors and/or circuits are further configured to receive said subset of information via one or more broadband connections between said servicing communication device and said plurality of location servers.

19. The method according to claim 1, wherein receiving the subset of information includes receiving the subset of information based on a location of the servicing communication device.

20. The system according to claim 10, wherein said one or more processors and/or circuits are configured to receive the subset of information based on a location of the servicing communication device.

* * * * *